United States Patent
Kato

(10) Patent No.: US 10,088,341 B2
(45) Date of Patent: Oct. 2, 2018

(54) PHOTOELECTRIC ENCODER

(71) Applicant: Mitutoyo Corporation, Kawasaki, Kanagawa (JP)

(72) Inventor: Yoshiaki Kato, Chiba (JP)

(73) Assignee: MITUTOYO CORPORATION, Kawasaki (JP)

(*) Notice: Subject to any disclaimer, the term of this patent is extended or adjusted under 35 U.S.C. 154(b) by 134 days.

(21) Appl. No.: 15/417,675

(22) Filed: Jan. 27, 2017

(65) Prior Publication Data

US 2017/0227384 A1 Aug. 10, 2017

(30) Foreign Application Priority Data

Feb. 5, 2016 (JP) ................... 2016-021126

(51) Int. Cl.
*G01D 5/347* (2006.01)

(52) U.S. Cl.
CPC ................ *G01D 5/34784* (2013.01)

(58) Field of Classification Search
CPC ... G01D 5/38; G01D 5/34784; G01D 5/34792
See application file for complete search history.

(56) References Cited

U.S. PATENT DOCUMENTS

| | | |
|---|---|---|
| 2004/0118758 A1 | 6/2004 | Gordon-Ingram |
| 2014/0263987 A1* | 9/2014 | Tobiason ........... G01D 5/34715 250/231.1 |

FOREIGN PATENT DOCUMENTS

JP 4008356 11/2007

* cited by examiner

*Primary Examiner* — Thanh Luu
(74) *Attorney, Agent, or Firm* — Rankin, Hill & Clark LLP

(57) ABSTRACT

The photoelectric encoder 1 includes a scale 2, and a detection head 3 including a light emitting unit 4, an index 5, and a detection unit 6. The index 5 includes a first index portion 50 consisting of diffraction portions and non-diffraction portions alternately juxtaposed at a predetermined pitch along the longitudinal direction of the scale 2, and a second index portion 51 consisting of diffraction portions and non-diffraction portions alternately juxtaposed at twice the pitch of the first index portion 50. The scale 2 is configured to include a first pattern portion 20 consisting of diffraction portions and non-diffraction portions alternately juxtaposed at a predetermined pitch along the longitudinal direction of the scale 2, and a second pattern portion 21 consisting of diffraction portions and non-diffraction portions arranged in a checkered pattern.

4 Claims, 12 Drawing Sheets

PHOTOELECTRIC ENCODER

CROSS-REFERENCE TO RELATED APPLICATION

This non-provisional application claims priority under 35 U.S.C. § 119(a) from Japanese Patent Application No. 2016-021126, filed on Feb. 5, 2016, the entire contents of which are incorporated herein by reference.

BACKGROUND

Technical Field

The present invention relates to a photoelectric encoder.

Related Art

Conventionally, a photoelectric encoder including a scale having a scale pattern, and a detection head that moves along the scale and detects a relative movement amount with the scale is known. The detection head includes a light emitting unit for irradiating with a light beam toward the scale, and a detection unit for detecting interference fringes generated by being diffracted by the scale to output an electric signal, and the relative movement amount is calculated based on the electric signal output from the detection unit.

Incremental (INC) type and absolute (ABS) type are known as a type of detecting the relative movement amount of such a photoelectric encoder. The INC type continuously detects incremental (INC) patterns provided on the scale at a constant pitch, and detects a relative position by counting up or counting down the number of graduations of the passed INC patterns. The ABS type detects absolute (ABS) patterns randomly provided on the scale at an appropriate timing, and detects absolute positions by analyzing the ABS patterns.

The photoelectric encoder includes one using either one of the INC type or the ABS type, and one using the INC-ABS combined type of using a juxtaposed scale of the INC pattern and the ABS pattern. However, the INC-ABS combined type has a problem that since the INC pattern and the ABS pattern juxtaposed in the transverse direction of the scale are detected by using respective different detection units, when the attitude of the detection head is displaced or undulation occurs in the scale, an error occurs in the position information detected by the detection unit. Thus, a position encoder (photoelectric encoder) using hybrid INC-ABS integrated scale patterns combining the INC patterns and the ABS patterns with a series of scale patterns has been proposed (see, for example, Japanese Patent No. 4008356).

SUMMARY OF THE INVENTION

However, in the photoelectric encoder using the conventional INC-ABS integrated scale patterns as described in Japanese Patent No. 4008356, the INC patterns are thinned out so as to be integrated with the ABS patterns, and are no longer a series of INC patterns continuous at a predetermined pitch. For this reason, there is a problem that the incremental (INC) signal detected by the INC patterns becomes an incomplete signal in a thinned state, and has deteriorated accuracy because the INC signal to be detected has a dropout as compared to the one using the INC patterns in a not thinned state, and that the detection accuracy of the photoelectric encoder decreases.

An object of the present invention is to provide a photoelectric encoder capable of reducing errors in position information between the INC patterns and the ABS patterns and capable of improving the detection accuracy by detecting an INC signal without signal dropout.

A photoelectric encoder of the present invention is a photoelectric encoder for acquiring position information from a relative movement amount between a scale having a scale pattern and a detection head, and the photoelectric encoder includes: a light emitting unit configured to emit a light beam; an index configured to diffract the light beam from the light emitting unit toward the scale; and a detection unit configured to detect an interference fringe generated through the index and the scale to output an electric signal, wherein the index includes: a first index portion consisting of diffraction portions and non-diffraction portions alternately arranged at a predetermined pitch along a longitudinal direction of the scale, and a second index portion consisting of diffraction portions and non-diffraction portions arranged alternately at twice the pitch of the first index portion, wherein the scale pattern includes: a first pattern portion consisting of diffraction portions and non-diffraction portions alternately arranged at a predetermined pitch along a longitudinal direction of the scale, and a second pattern portion consisting of diffraction portions and non-diffraction portions arranged in a checkered pattern at a predetermined pitch along a longitudinal direction of the scale, wherein the first pattern portion and the second pattern portion are alternately juxtaposed along a longitudinal direction of the scale, and wherein the detection unit detects: an incremental signal by an interference fringe generated by the first index portion, the first pattern portion, and the second pattern portion, and an absolute signal by an interference fringe generated by the second index portion, the first pattern portion, and the second pattern portion.

Here, the diffraction means a phenomenon in which when a light beam is intercepted by an obstacle, the light beam propagates so as to go around the obstacle. A diffraction grating having diffraction portions and non-diffraction portions for yielding this phenomenon includes a transmission type in which a light beam transmitted through the diffraction portions and the non-diffraction portions from the irradiated light beam is diffracted at an arbitrary angle, and a reflection type in which the light beam reflected through the diffraction portions and the non-diffraction portions from the irradiated light beam is diffracted at an arbitrary angle.

According to the present invention, diffracting the light beam from the light emitting unit through two types of index portions of a predetermined pitch and a pitch twice the predetermined pitch and a series of scale patterns in which two types of pattern portions having different arrangement patterns are alternately juxtaposed to generate interference fringes allows the detection of an incremental (INC) signal and an absolute (ABS) signal.

In the present invention, since the INC signal to be detected is detected as one INC signal in a non-dropout state, even when the INC pattern and the ABS pattern are integrated into a series of scale patterns to be arranged, the detection accuracy of the position information can be improved. In addition, since the ABS signal can also be obtained at the same time, more accurate position information can be detected, and the accuracy of the position information to be detected can be improved.

Furthermore, even when the attitude of the detection head deviates from the scale or there is undulation on the scale, the errors in the position information conventionally caused by separate reading can be reduced, and therefore the detection unit can stably detect position information.

In addition, although a signal is detected from each pattern by using a lens optical system in an ordinary photoelectric encoder, since the present invention has a configuration capable of being achieved without using a lens and the like, the photoelectric encoder can be configured with a small number of components, and cost reduction and miniaturization can be achieved.

On this occasion, in the photoelectric encoder of the present invention, it is preferred that the first pattern portion and the second pattern portion are juxtaposed in such a manner that mutual lengths of the first pattern portion and the second pattern portion along the longitudinal direction of the scale make an M-sequence code.

Typically, a Gray code is used for the ABS pattern for generating the ABS signal. The Gray code is a type of binary number called an alternating binary code, and has a feature that the changing bit is always limited to one place when codes of adjacent numerical values are compared. As a code having a resolution equivalent to that of this Gray code, there is an arrangement pattern based on an M-sequence code being a part of a pseudo random code.

The M-sequence code is formed by (2 to the power of n−1) codes consisting of 0 or 1, and is a pattern in which all combinations of n consecutive codes are different code strings. The detection unit can detect the absolute position from the arrangement pattern of the M-sequence code by reading n consecutive 0 or 1 codes.

Arranging the first pattern portion and the second pattern portion along the longitudinal direction of the scale in such a manner that their mutual lengths make an M sequence code allows encoding the ABS signal appearing corresponding to this arrangement as 0 or 1 to calculate, and therefore more detailed position information can be calculated.

On this occasion, it is preferred that the first index portion and the second index portion are juxtaposed in a transverse direction of the scale.

This configuration allows the index to shorten the length in the longitudinal direction of the scale as compared with the case of being juxtaposed in the longitudinal direction of the scale, and therefore cost reduction and miniaturization can be achieved.

DETAILED DESCRIPTION OF THE EMBODIMENTS

First Embodiment

In the following, the first embodiment of the present invention will be described with reference to the drawings.

In each figure, let the longitudinal direction of the scale be denoted as the X direction, let the transverse direction be denoted as the Y direction, and let the height direction be denoted as the Z direction, and in the following description, they will be sometimes respectively described as X direction, Y direction, and Z direction.

Figure 1:
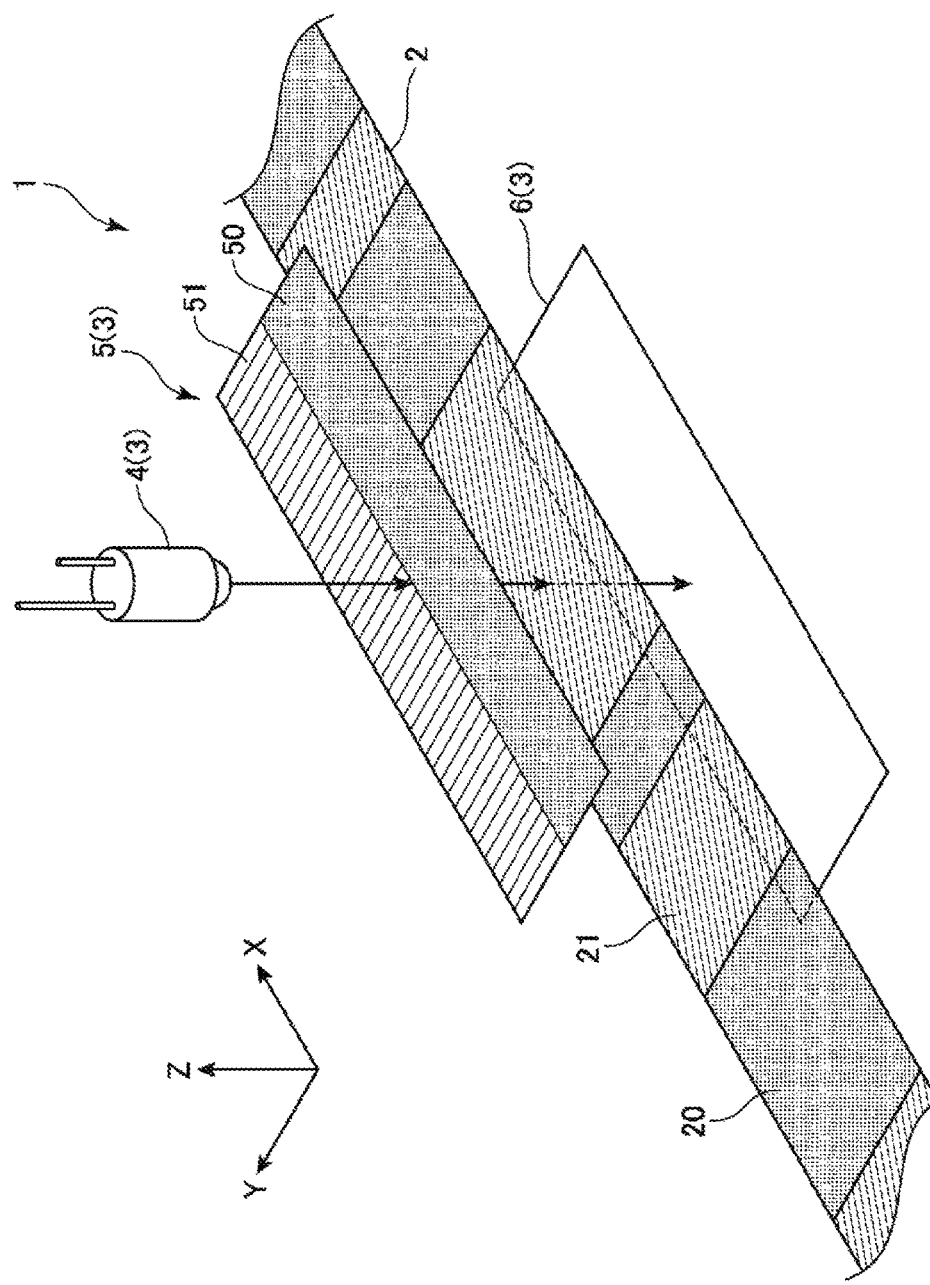
FIG. 1 is a perspective view showing a photoelectric encoder according to a first embodiment of the present invention.

FIG. 1 is a perspective view showing a photoelectric encoder according to a first embodiment of the present invention.

The photoelectric encoder 1 includes an elongated scale 2, and a detection head 3 for moving along the scale 2 and for acquiring the position information from the relative movement amount with the scale 2.

The detection head 3 includes a light emitting unit 4 for irradiating with a light beam, an index 5 for diffracting the light beam from the light emitting unit 4 toward the scale 2, and a detection unit 6 for detecting interference fringes generated through the scale 2 and the index 5 to output an electric signal. The detection head 3 including these is integrally provided so as to be capable of reciprocating in the X direction with respect to the scale 2.

The scale 2 is formed of a translucent member such as glass capable of transmitting a light beam from the light emitting unit 4, and includes a transmissive diffraction grating provided on one side of the scale 2. In the transmissive diffraction grating, the diffraction portion is a transmission portion, and the non-diffraction portion is a non-transmission portion. The transmissive diffraction grating provided on one side of the scale 2 has alternate arrangement along the X direction of a first pattern portion 20 consisting of transmission portions and non-transmission portions juxtaposed alternately at a predetermined pitch P along the X direction and a second pattern portion 21 consisting of transmission portions and non-transmission portions arranged in a checkered pattern at a predetermined pitch along the X direction to be provided.

The light emitting unit 4 uses, for example, an LED (Light Emitting Diode). It should be noted that the light emitting unit 4 may use not limited to an LED, but also any light source. In addition, the light emitting unit 4 is installed at an appropriate angle so as to irradiate the scale 2 and the index 5 with a light beam.

The index 5 is formed of a translucent member such as glass capable of transmitting a light beam from the light emitting unit 4, and is installed facing the scale 2 so as to overlap on one side in the Z direction of the scale 2 (upward). Then, a transmissive diffraction grating is provided on one side of the index 5. Specifically, a first index portion 50 consisting of transmission portions and non-transmission portions juxtaposed alternately at a predetermined pitch along the X direction and a second index portion 51 consisting of transmission portions and non-transmission portions juxtaposed alternately at twice the pitch of the first index portion 50 are provided, and the first index portion 50 and the second index portion 51 are juxtaposed in the Y direction of the index 5.

The detection unit 6 uses a PDA (Photo Diode Array), and is installed facing the scale 2 so as to overlap on another side in the Z direction of the scale 2 (downward). That is, the index 5 and the detection unit 6 are installed facing each other so as to overlap with each other across the scale 2, and are installed in positions where the respective distances from the scale 2 are the same.

The PDA is a detector having a property capable of measuring a plurality of interference fringes at a time. It should be noted that the detection unit 6 may use not limited to a PDA, but any detector such as a PSD (Position Sensitive Detector) and a CCD (Charge-Coupled Device).

The detection unit 6 detects the INC signal by using the interference fringes generated by the first index portion 50, the first pattern portion 20, and the second pattern portion 21, and detects the ABS signal by using the interference fringes generated by the second index portion 51, the first pattern portion 20, and the second pattern portion 21. The INC signal and the ABS signal detected by the detection unit 6 are analyzed by a microcomputer (not shown) and the like and displayed as position information on a display unit (not shown).

The photoelectric encoder 1 of the present invention is configured by the scale 2 and the detection head 3 including the light emitting unit 4, the index 5, and the detection unit 6 as described above.

Figure 2:
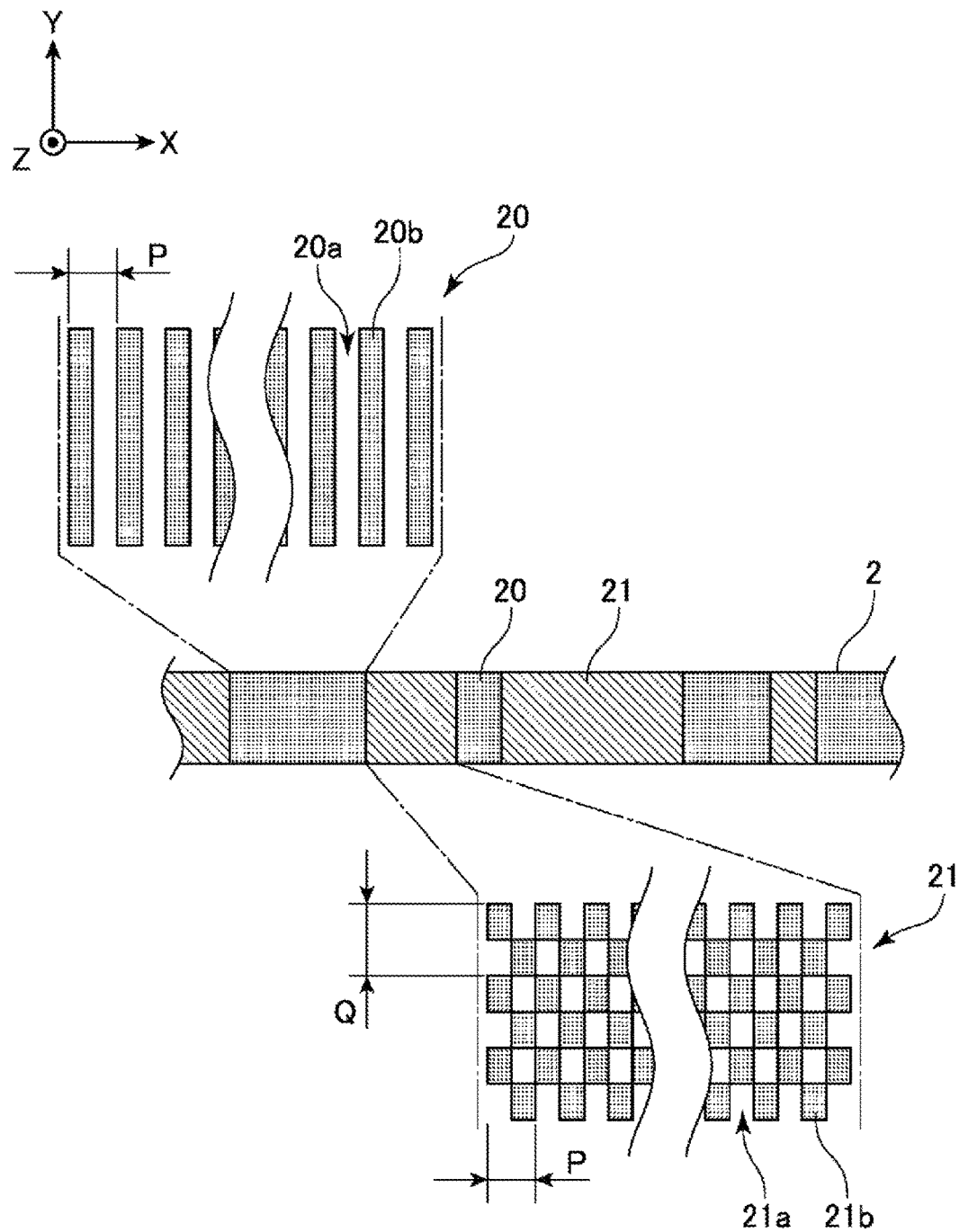
FIG. 2 illustrates a scale of the photoelectric encoder.

FIG. 2 is a diagram illustrating the scale of the photoelectric encoder.

As illustrated in FIG. 2, the scale 2 is configured to include a scale pattern in which the first pattern portion 20 and the second pattern portion 21 are alternately arranged in the X direction. These first pattern portion 20 and second pattern portion 21 are arranged so that their mutual lengths along the X direction represent an M-sequence code.

The first pattern portion 20 includes transmission portions 20a and non-transmission portions 20b alternately arranged in the X direction. The transmission portions 20a and the non-transmission portions 20b are arranged at a predetermined pitch P in the X direction, and the length of the non-transmission portion 20b in the X direction is set to P/2.

The second pattern portion 21 includes transmission portions 21a and non-transmission portions 21b arranged in a checkered pattern. The transmission portions 21a and the non-transmission portions 21b are arranged at the predetermined pitch P in the X direction and arranged at a pitch Q in the Y direction. In addition, the length of the non-transmission portion 21b in the X direction is set to P/2 and the length in the Y direction is set to Q/2. The pitch Q in the Y direction may be made the same as the predetermined pitch P in the X direction, whereby the non-transmission portion 21b may be formed in a square shape, may be made larger than the predetermined pitch P, whereby the non-transmission portion 21b may be formed in a rectangular shape longer in the Y direction, and may be made smaller than the predetermined pitch P, whereby the non-transmission portion 21b may be formed in a rectangular shape longer in the X direction.

Figure 3:
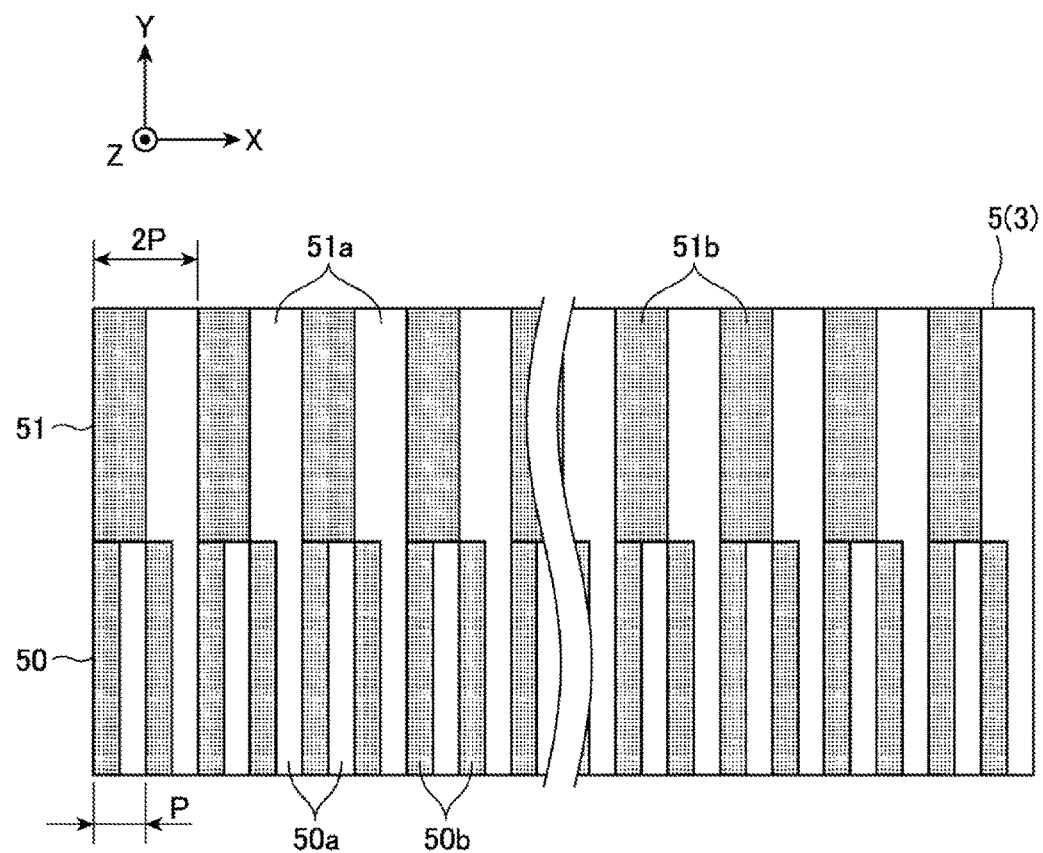
FIG. 3 illustrates an index of the photoelectric encoder.

FIG. 3 is a diagram illustrating the index of the photoelectric encoder.

As illustrated in FIG. 3, the index 5 includes a first index portion 50 and a second index portion 51, and the first index portion 50 and the second index portion 51 are juxtaposed in the Y direction of the index 5.

The first index portion 50 includes transmission portions 50a and non-transmission portions 50b alternately arranged in the X direction. The transmission portions 50a and the non-transmission portions 50b are arranged at a predetermined pitch P in the X direction, and the length of the non-transmission portion 50b in the X direction is set to P/2.

The second index portion 51 includes transmission portions 51a and non-transmission portions 51b alternately arranged in the X direction. The transmission portions 51a and the non-transmission portions 51b are arranged at a predetermined pitch 2P, twice the predetermined pitch P, in the X direction, and the length of the non-transmission portion 51b in the X direction is set to P.

Here, the first pattern portion 20 and the second pattern portion 21 (see FIG. 2) of the scale 2 and the first index portion 50 of the index 5 include the respective transmission portions 20a, 21a, and 50a and non-transmission portions 20b, 21b, and 50b whose predetermined pitches P in the X direction are set to be the same. That is, the lengths of the transmission portions 20a, 21a, and 50a and the non-transmission portions 20b, 21b, and 50b in the X direction are set to the same P/2.

Figure 4A:
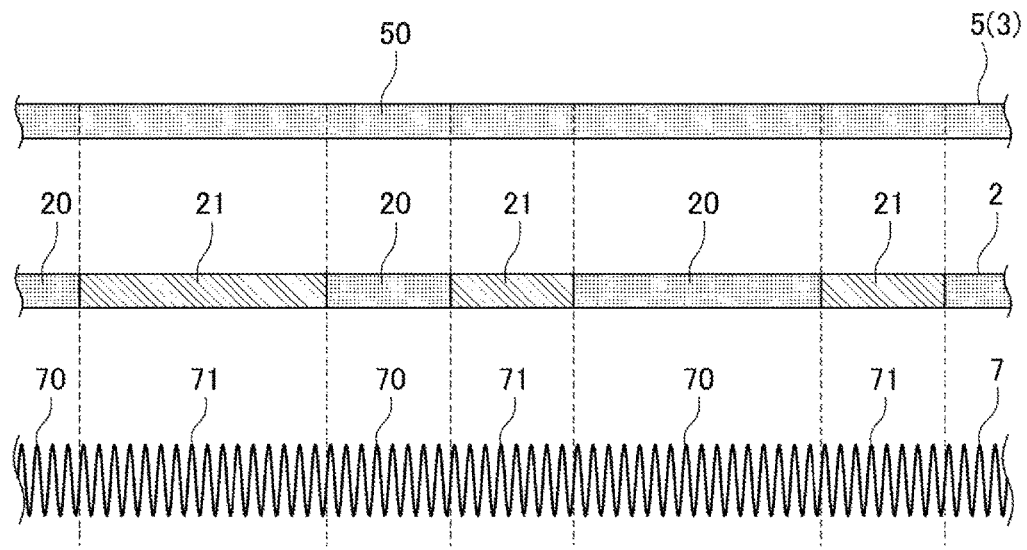
FIG. 4A is a diagram illustrating that an INC signal is generated by a scale and the first index portion.
Figure 4B:
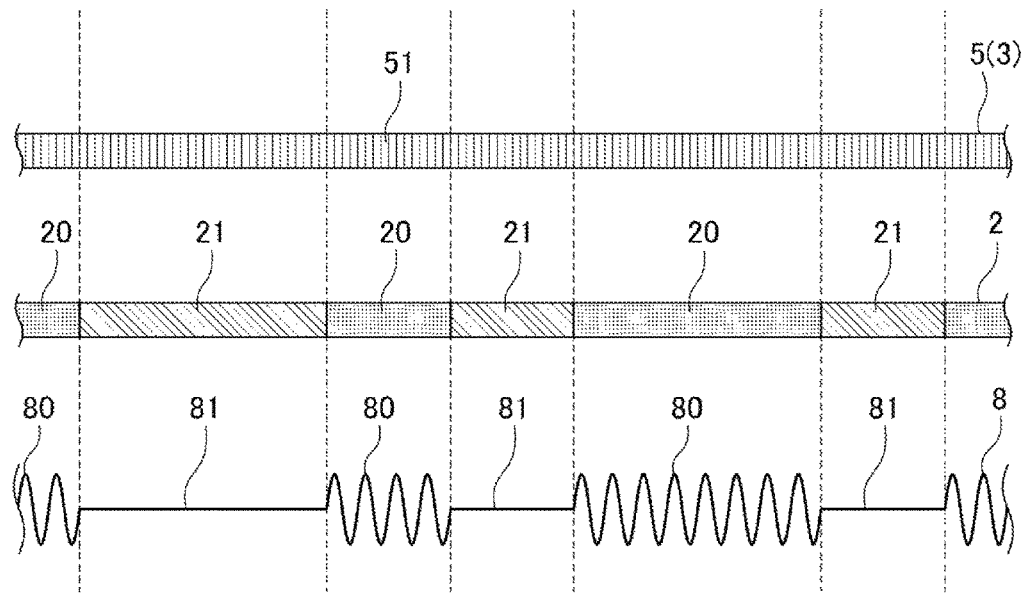
FIG. 4B is a diagram illustrating that an ABS signal is generated by the scale and the second index portion.

FIGS. 4A and 4B are diagrams illustrating signals detected by the photoelectric encoder.

Specifically, FIG. 4A is a diagram illustrating that the INC signal 7 is generated by the scale 2 and the first index portion 50, and FIG. 4B is a diagram illustrating that the ABS signal 8 is generated by the scale 2 and the second index portion 51.

As illustrated in FIG. 4A, the INC signal 7 is generated by the scale 2 and the first index portion 50 and detected by the detection unit 6 (see FIG. 1).

First, the scale 2 is irradiated with the light beam from the light emitting unit 4 through the transmission portions 50a and the non-transmission portions 50b of the first index portion 50 in the index 5 (see FIG. 3). Then, the light beam transmitted through the transmission portions 50a of the first index portion 50 generates interference fringes through the transmission portions 20a and the non-transmission portions 20b of the first pattern portion 20 in the scale 2 (see FIG. 2). The detection unit 6 detects a signal 70 from the generated interference fringes.

Next, the scale 2 is irradiated with the light beam from the light emitting unit 4 through the transmission portions 50a and the non-transmission portions 50b of the first index portion 50 in the index 5. Then, the light beam transmitted through the transmission portions 50a of the first index portion 50 generates interference fringes through the transmission portions 21a and the non-transmission portions 21b of the second pattern portion 21 in the scale 2 (see FIG. 2). The detection unit 6 detects a signal 71 from the generated interference fringes.

Since the signals 70 and 71 detected by the detection unit 6 are signals having the same period and the same phase, the superimposition on each other generates one signal. Therefore, the photoelectric encoder 1 can detect the INC signal 7 by the analysis by a microcomputer and the like (not shown).

As illustrated in FIG. 4B, the ABS signal 8 is generated by the scale 2 and the second index portion 51 and detected by the detection unit 6 (see FIG. 1).

First, the scale 2 is irradiated with the light beam from the light emitting unit 4 through the transmission portions 51a and the non-transmission portions 51b of the second index portion 51 in the index 5 (see FIG. 3). Then, the light beam transmitted through the transmission portions 51a of the second index portion 51 generates interference fringes through the transmission portions 20a and the non-transmission portions 20b of the first pattern portion 20 in the scale 2 (see FIG. 2). The detection unit 6 detects a signal 80 from the generated interference fringes.

Next, the scale 2 is irradiated with the light beam from the light emitting unit 4 through the transmission portions 51a and the non-transmission portions 51b of the second index portion 51 in the index 5. Then, the light beam transmitted through the transmission portions 51a of the second index portion 51 generates interference fringes through the transmission portions 21a and the non-transmission portions 21b of the second pattern portion 21 in the scale 2 (see FIG. 2). The detection unit 6 detects a plurality of signals of the same period with the phase shifted by 180° from the generated interference fringes. The detection unit 6 cannot detect a signal because the plurality of signals of the same period with the phase shifted by 180° cancel each other. Therefore, the detection unit 6 detects the non-signal 81.

In the following, the action of the photoelectric encoder 1 by the second pattern portion 21 having the checkered pattern in the scale 2 and the index 5 will be described with reference to FIGS. 5A to 5C and FIGS. 6A to 6C.

FIGS. 5A to 5C and FIGS. 6A to 6C are diagrams illustrating the action of the scale 2 and the index 5 of the photoelectric encoder 1.

Figure 5A:
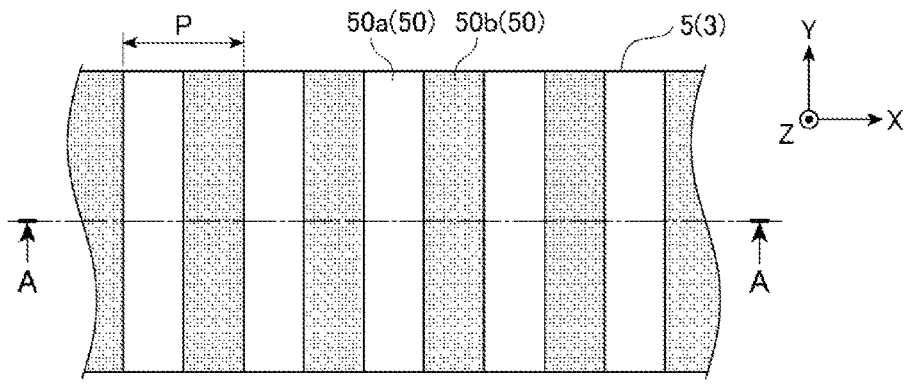
FIG. 5A illustrates the first index portion in an index.
Figure 5B:
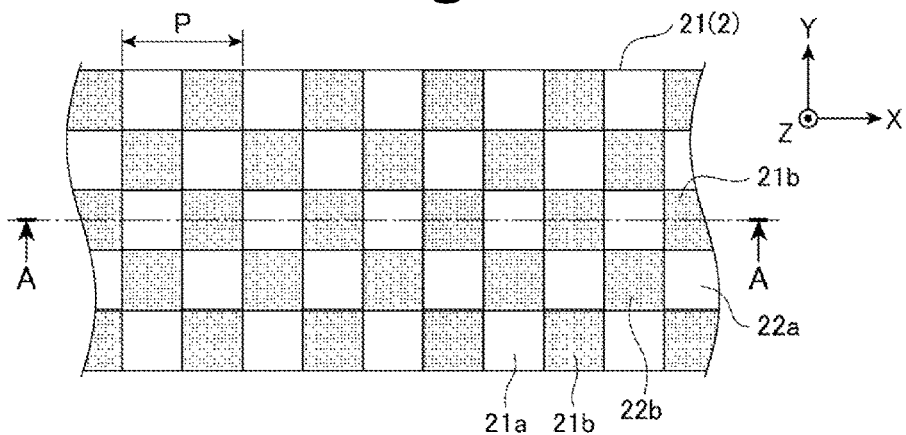
FIG. 5B illustrates the second pattern portion in the scale.
Figure 5C:
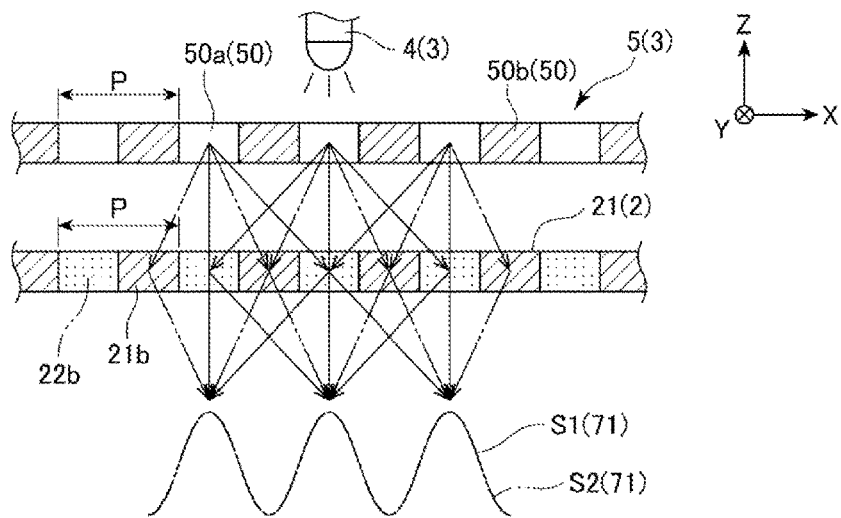
FIG. 5C illustrates an action of the photoelectric encoder by the second pattern portion and the first index portion in the cross section taken along line A-A of FIGS. 5A and 5B.

FIG. 5A illustrates the first index portion 50 in the index 5. FIG. 5B illustrates the second pattern portion 21 in the scale 2. FIG. 5C illustrates an action of the photoelectric encoder 1 by the second pattern portion 21 and the first index portion 50 in the cross section taken along line A-A of FIGS. 5A and 5B.

In the first index portion 50 illustrated in FIG. 5A, the transmission portions 50a and the non-transmission portions 50b are alternately arranged at a predetermined pitch P along the X direction of the scale 2. In the second pattern portion 21 illustrated in FIG. 5B, the transmission portions 21a and 22a and the non-transmission portions 21b and 22b are arranged in a checkered pattern, and these transmission portions 21a and 22a and the non-transmission portions 21b and 22b are each arranged at a predetermined pitch P along the X direction, are juxtaposed with each other in the Y direction of the scale 2, and are arranged to be shifted from each other by half a period in the X direction.

As illustrated in FIG. 5C, the first index portion 50 where the non-transmission portions 50b having a length P/2 in the X direction are arranged at a predetermined pitch P diffracts the light beam from the light emitting unit 4, and transmits the diffracted light beam toward the second pattern portion 21. The second pattern portion 21 diffracts the light beam from the light emitting unit 4 by the transmission portions 21a and the non-transmission portions 21b, the diffracted light beam advances in the direction indicated by the solid arrow to make interference fringes, and the interference fringes are detected as a signal S1 by the detection unit 6 (not shown).

In addition, the light beam from the light emitting unit 4 diffracted by the transmission portions 22a and the non-transmission portions 22b of the second pattern portion 21 advances in the direction of the two-dot chain line arrow to make interference fringes, and the interference fringes are detected as a signal S2 by the detection unit 6. Therefore, since a plurality of signals S1 and S2 having the same phase and the same period are detected from interference fringes by the detection unit 6, and these signals S1 and S2 are signals of the same phase and the same period, the signals S1 and S2 are superimposed on each other and detected as the signal 71 as illustrated in FIG. 4A.

Figure 6A:
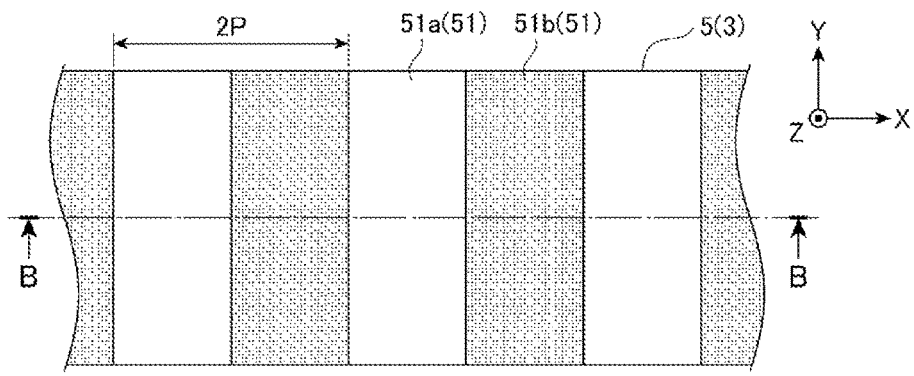
FIG. 6A illustrates the second index portion in the index.
Figure 6B:
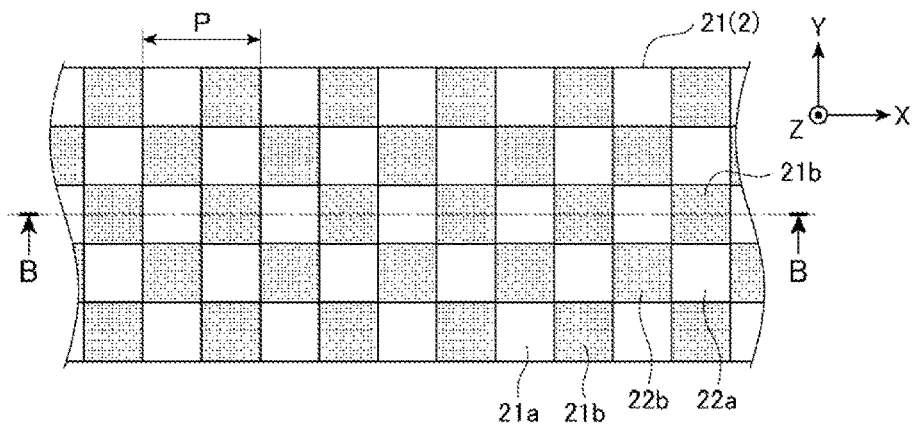
FIG. 6B illustrates the second pattern portion.
Figure 6C:
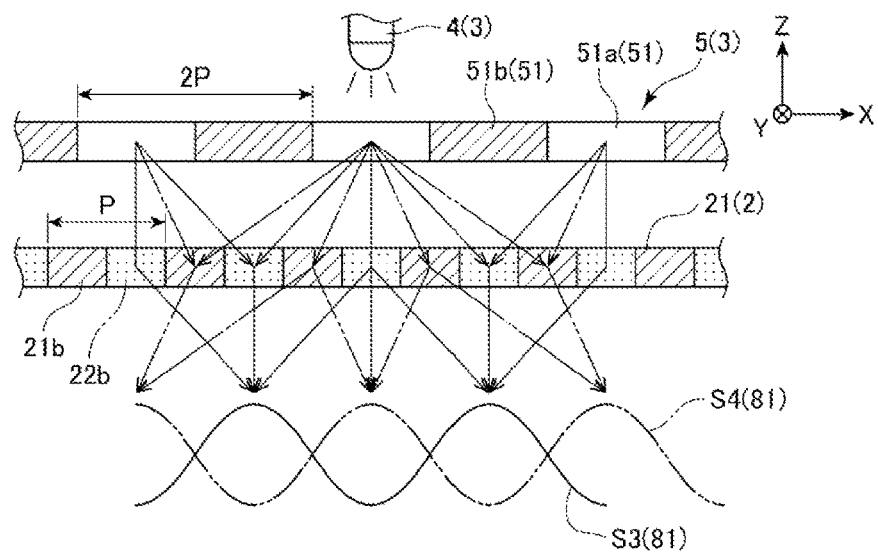
FIG. 6C illustrates an action of the photoelectric encoder by the second pattern portion and the second index portion in the cross section taken along line B-B of FIGS. 6A and 6B.

FIG. 6A illustrates the second index portion 51 in the index 5. FIG. 6B illustrates the second pattern portion 21. FIG. 6C illustrates an action of the photoelectric encoder 1 by the second pattern portion 21 and the second index portion 51 in the cross section taken along line B-B of FIGS. 6A and 6B.

In the second index portion 51 illustrated in FIG. 6A, the transmission portions 51a and the non-transmission portions 51b are alternately arranged at a predetermined pitch 2P, twice the predetermined pitch P, along the X direction of the scale 2. The second pattern portion 21 illustrated in FIG. 6B is the same as that illustrated in FIG. 5B.

As illustrated in FIG. 6C, the second index portion 51 where the non-transmission portions 51b having a length P in the X direction are arranged at a predetermined pitch 2P diffracts the light beam from the light emitting unit 4, and transmits the diffracted light beam toward the second pattern portion 21. The second pattern portion 21 diffracts the light beam from the light emitting unit 4 by the transmission portions 21a and the non-transmission portions 21b, the diffracted light beam advances in the direction indicated by the solid arrow to make interference fringes, and the interference fringes are detected as a signal S3 by the detection unit 6 (not shown).

In addition, the light beam from the light emitting unit 4 diffracted by the transmission portions 22a and the non-transmission portions 22b of the second pattern portion 21 advances in the direction of the two-dot chain line arrow to make interference fringes, and the interference fringes are detected as a signal S4 by the detection unit 6. Therefore, two types of signals S3 and S4 having the same period and being 180° out of phase are detected from the interference fringes by the detection unit 6, these two types of signals S3 and S4 cancel each other because they have the same period and are 180° out of phase, and the detection unit 6 detects the non-signal 81 as illustrated in FIG. 4B.

As illustrated in FIG. 4B, the detection unit 6 detects the signal 80 and the non-signal 81 by the action as described above. Here, since the first pattern portion 20 and the second pattern portion 21 are arranged so as to be an arrangement pattern of the M-sequence code, the detected signal 80 and the non-signal 81 are analyzed by a microcomputer (not shown) and the like, whereby the ABS signal 8 can be detected.

According to the present embodiment as described above, the following actions and effects can be obtained.

(1) The photoelectric encoder 1 transmits the light beam from the light emitting unit 4 to the index 5 and generates interference fringes by transmitting the light beam transmitted to the index 5 further to the scale 2, and the INC signal 7 to be detected from the generated interference fringes is detected as one INC signal 7 in a non-dropout state, and therefore even when the INC pattern and the ABS pattern are integrated into a series of scale patterns to be arranged, the detection accuracy of the position information can be improved.

(2) In addition, since the ABS signal 8 can also be obtained at the same time as the INC signal 7, more accurate position information can be detected, and the accuracy of the position information to be detected can be improved.

(3) Furthermore, even if the attitude of the detection head 3 deviates from the scale 2 or there is undulation in the scale 2, the scale 2 includes the first pattern portion 20 and the second pattern portion 21 in a series of scale patterns, whereby the error of the position information caused by separately reading the INC pattern and the ABS pattern can be reduced. Therefore, the detection unit 6 can stably detect position information.

(4) Since the photoelectric encoder 1 has the configuration capable of being achieved without using lenses and the like by using the scale 2 and the index 5, the photoelectric encoder 1 can be configured with a small number of components, and the cost reduction and the miniaturization can be achieved.

(5) Arranging the first pattern portion 20 and the second pattern portion 21 of the scale 2 along the X direction so that their mutual lengths make a M-sequence code, and encoding the ABS signal appearing corresponding to this arrangement as 0 or 1 to calculate allows more detailed position information to be calculated.

(6) Since the juxtaposition of the first index portion 50 and the second index portion 51 in the Y direction in the index 5 allows the index 5 to shorten the length in the X direction of the scale 2 as compared to the case of the juxtaposition in the X direction, cost reduction and miniaturization can be achieved.

Second Embodiment

In the following, the second embodiment of the present invention will be described with reference to the drawings.

Although in the first embodiment, the transmissive diffraction grating is provided in the scale 2 and the index 5, the reflective diffraction grating may be provided in the scale 2 and the transmissive diffraction grating may be provided in the index 5.

Figure 7:
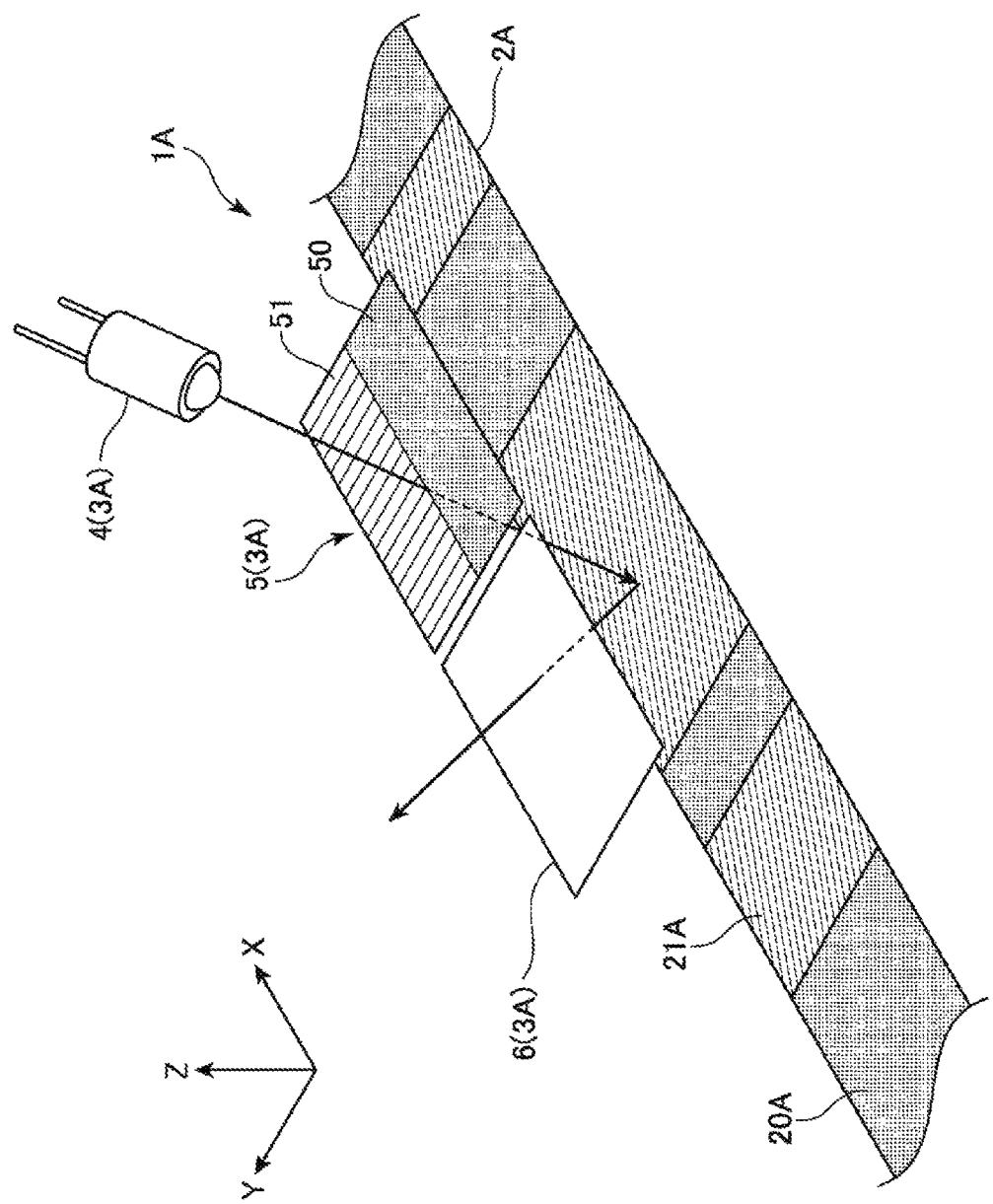
FIG. 7 is a perspective view showing a photoelectric encoder according to a second embodiment of the present invention.

FIG. 7 is a perspective view showing a photoelectric encoder according to the second embodiment of the present invention.

The photoelectric encoder 1A includes an elongated scale 2A, and a detection head 3A for moving along the scale 2A and for acquiring the position information from the relative movement amount with the scale 2A.

The detection head 3A includes a light emitting unit 4 for irradiating with a light beam, an index 5 for transmitting the light beam from the light emitting unit 4 toward the scale 2A, and a detection unit 6 for detecting interference fringes generated through the scale 2A and the index 5 to output an electric signal. The detection head 3A including these is integrally provided so as to be capable of reciprocating in the X direction with respect to the scale 2A.

The scale 2A is formed of a member capable of reflecting the light beam emitted from the light emitting unit 4 such as glass coated with metal on one side, and the reflective diffraction grating is provided on one side of the scale 2A. In the reflective diffraction grating, the diffraction portion is a reflection portion, and the non-diffraction portion is a non-reflection portion. The reflective diffraction grating provided on one side of the scale 2A has alternate arrangement along the X direction of a first pattern portion 20A consisting of reflection portions and non-reflection portions juxtaposed alternately at a predetermined pitch P along the X direction, and a second pattern portion 21A consisting of reflection portions and non-reflection portions arranged in a checkered pattern at a predetermined pitch along the X direction to be provided.

Although the light emitting unit 4 and the index 5 are the same as those shown in FIG. 1, the light emitting unit 4 is installed at an appropriate angle to reflect the irradiated light beam to the scale 2A.

The detection unit 6 is installed facing the scale 2A on one side in the Z direction of the scale 2A (upward). That is, the index 5 and the detection unit 6 are juxtaposed in the X direction on one side in the Z direction of the scale 2A (upward), and are installed in positions where the respective distances from the scale 2A are the same.

The detection unit 6 detects the INC signal by using the interference fringes generated by the first index portion 50, the first pattern portion 20A, and the second pattern portion 21A, and detects the ABS signal by using the interference fringes generated by the second index portion 51, the first pattern portion 20A, and the second pattern portion 21A. The INC signal and the ABS signal detected by the detection unit 6 are analyzed by a microcomputer (not shown) and the like and displayed as position information on a display unit (not shown).

The photoelectric encoder 1A of the present invention is configured by the scale 2A and the detection head 3A including the light emitting unit 4, the index 5, and the detection unit 6 as described above.

Figure 8:
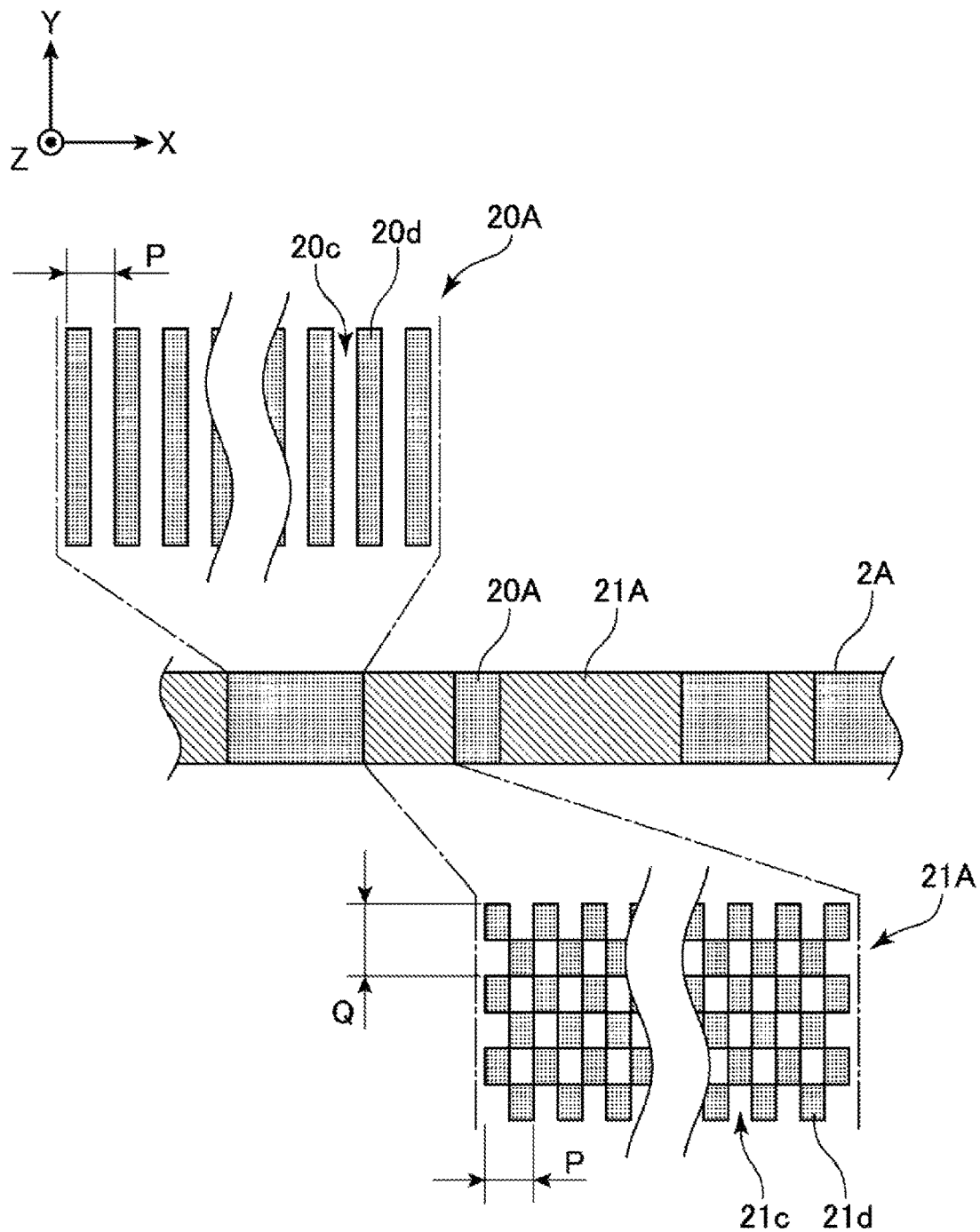
FIG. 8 illustrates a scale of the photoelectric encoder.

FIG. 8 is a diagram illustrating the scale of the photoelectric encoder according to the second embodiment.

As illustrated in FIG. 8, the scale 2A having a reflective diffraction grating is configured to include a scale pattern in which the first pattern portion 20A and the second pattern portion 21A are alternately arranged in the X direction. These first pattern portion 20A and second pattern portion 21A are arranged so that their mutual lengths along the X direction represent an M-sequence code.

The first pattern portion 20A includes reflection portions 20c and non-reflection portions 20d alternately arranged in the X direction. The reflection portions 20c and the non-reflection portions 20d are arranged at a predetermined pitch P in the X direction, and the length of the non-reflection portion 20d in the X direction is set to P/2.

The second pattern portion 21A includes reflection portions 21c and non-reflection portions 21d arranged in a checkered pattern. The reflection portions 21c and the non-reflection portions 21d are arranged at the predetermined pitch P in the X direction and arranged at a pitch Q in the Y direction. In addition, the length of the non-reflection portion 21d in the X direction is set to P/2, and the length in the Y direction is set to Q/2. The pitch Q in the Y direction may be made the same as the predetermined pitch P in the X direction, whereby the non-reflection portion 21d may be formed in a square shape; may be made larger than the predetermined pitch P, whereby the non-reflection portion 21d may be formed in a rectangular shape longer in the Y direction; and may be made smaller than the predetermined pitch P, whereby the non-reflection portion 21d may be formed in a rectangular shape longer in the X direction.

Here, in the first pattern portion 20A and the second pattern portion 21A of the scale 2A and the first index portion 50 of the index 5 (see FIG. 3), the lengths of the reflection portions 20c and 21c, the transmission portion 50a, the non-reflection portions 20d and 21d, and the non-transmission portion 50b in the X direction are set to the identical P/2.

This configuration causes the light beam from the light emitting unit 4 to pass through the first index portion 50, and the first pattern portion 20A and the second pattern portion 21A of the scale 2A having the reflective diffraction grating are irradiated with the light beam diffracted by the transmission. The irradiated light beam is reflected by the first pattern portion 20A and the second pattern portion 21A, the light beam diffracted by the reflection is applied to the detection unit 6 as interference fringes, and the detection unit 6 detects the INC signal 7 from the interference fringes (see FIG. 4A).

In addition, the light beam from the light emitting unit 4 passes through the second index portion 51, and the first pattern portion 20A and the second pattern portion 21A of the scale 2A having the reflective diffraction grating are irradiated with the light beam diffracted by the transmission. The irradiated light beam is reflected by the first pattern portion 20A and the second pattern portion 21A, the light beam diffracted by the reflection is applied to the detection unit 6 as interference fringes, and the detection unit 6 detects the ABS signal 8 from the interference fringes (see FIG. 4B).

According to the present embodiment as described above, the same actions and effects as (2) to (6) in the above embodiment can be exhibited, and the following actions and effects can be exhibited.

(7) The photoelectric encoder 1A transmits the light beam from the light emitting unit 4 to the index 5 and generates interference fringes by causing the light beam transmitted through the index 5 to be reflected by the scale 2A, and the INC signal 7 to be detected from the generated interference fringes is detected as one INC signal 7 in a non-dropout state, and therefore even when the INC pattern and the ABS pattern are integrated into a series of scale patterns to be arranged, the detection accuracy of the position information can be improved.

Third Embodiment

In the following, the third embodiment of the present invention will be described with reference to the drawings.

Although in the second embodiment, the reflective diffraction grating is provided in the scale 2A, and the transmissive diffraction grating is provided in the index 5, a transmissive diffraction grating may be provided in the scale 2, and a reflective diffraction grating may be provided in the index 5.

Figure 9:
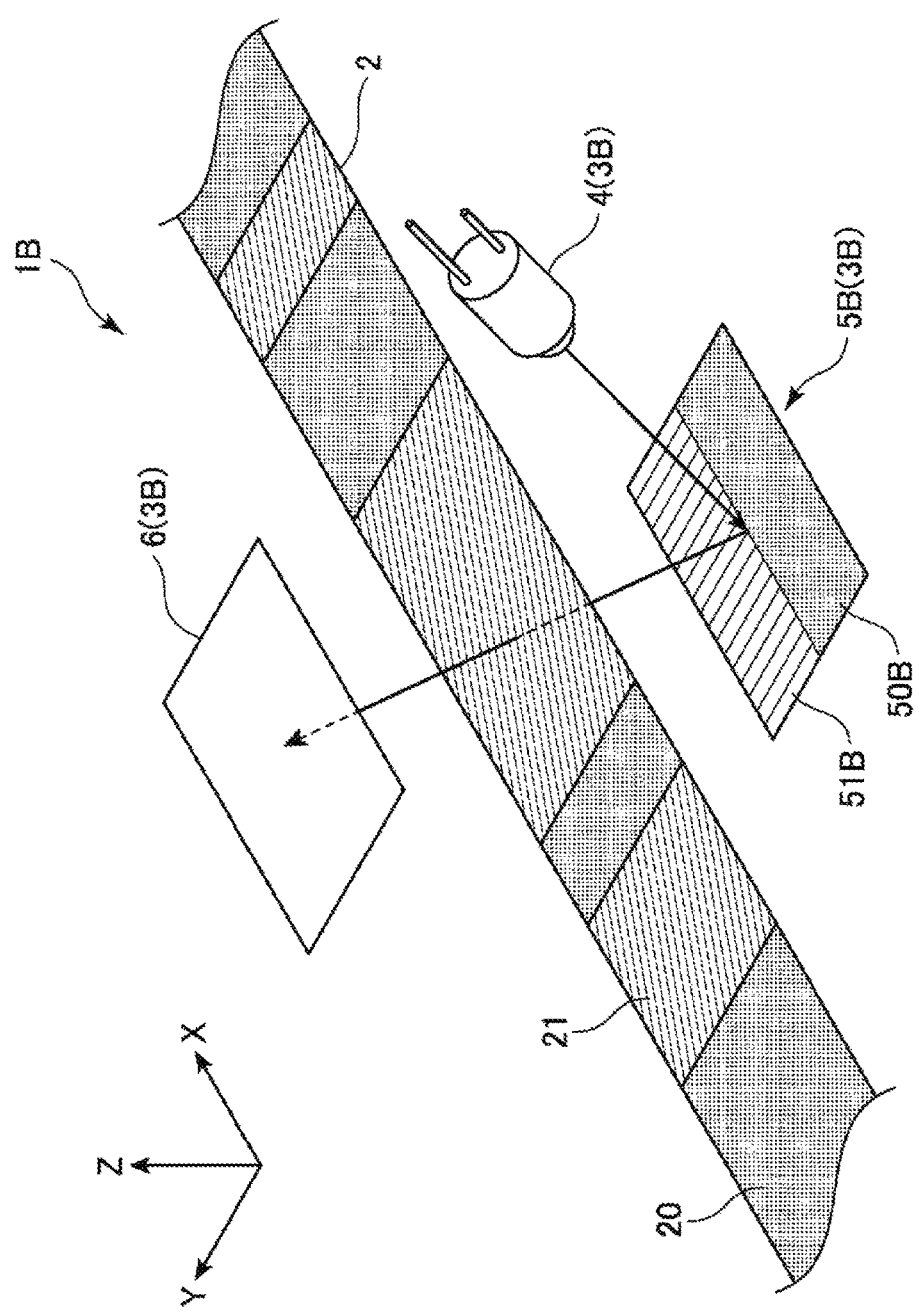
FIG. 9 is a perspective view showing a photoelectric encoder according to a third embodiment of the present invention.

FIG. 9 is a perspective view showing a photoelectric encoder according to the third embodiment of the present invention.

The photoelectric encoder 1B includes an elongated scale 2, and a detection head 3B for moving along the scale 2 and for acquiring the position information from the relative movement amount with the scale 2.

The detection head 3B includes a light emitting unit 4 for irradiating with a light beam, an index 5B for reflecting the light beam from the light emitting unit 4 toward the scale 2, and a detection unit 6 for detecting interference fringes generated through the scale 2 and the index 5B to output an electric signal. The detection head 3B including these is integrally provided so as to be capable of reciprocating in the X direction with respect to the scale 2.

Although the scale 2 and the light emitting unit 4 are the same as those shown in FIG. 1, the light emitting unit 4 is installed at an appropriate angle to cause the index 5B to reflect the irradiated light beam.

The index 5B is formed of a member capable of reflecting the light beam emitted from the light emitting unit 4 such as glass coated with metal on one side, and is installed facing the scale 2 on another side in the Z direction of the scale 2 (downward). Then, a reflective diffraction grating is provided on one side of the index 5B. In the reflective diffraction grating, the diffraction portion is a reflection portion, and the non-diffraction portion is a non-reflection portion. In the reflective diffraction grating provided on one side of the index 5B, a first index portion 50B consisting of reflection portions and non-reflection portions juxtaposed alternately at a predetermined pitch along the X direction and a second index portion 51B consisting of reflection portions and non-reflection portions juxtaposed alternately at twice the pitch of the first index portion 50B are provided, and the first index portion 50B and the second index portion 51B are juxtaposed in the Y direction of the index 5B.

The detection unit 6 is installed facing the scale 2 on one side in the Z direction of the scale 2 (upward). That is, the index 5B and the detection unit 6 are installed facing each other across the scale 2, and are installed in positions where the respective distances from the scale 2 are the same.

The detection unit 6 detects the INC signal by using the interference fringes generated by the first index portion 50B, the first pattern portion 20, and the second pattern portion 21, and detects the ABS signal by using the interference fringes generated by the second index portion 51B, the first pattern portion 20, and the second pattern portion 21. The INC signal and the ABS signal detected by the detection unit 6 are analyzed by a microcomputer (not shown) and the like and displayed as position information on a display unit (not shown).

The photoelectric encoder 1B of the present invention is configured by the scale 2 and the detection head 3B including the light emitting unit 4, the index 5B, and the detection unit 6 as described above.

Figure 10:
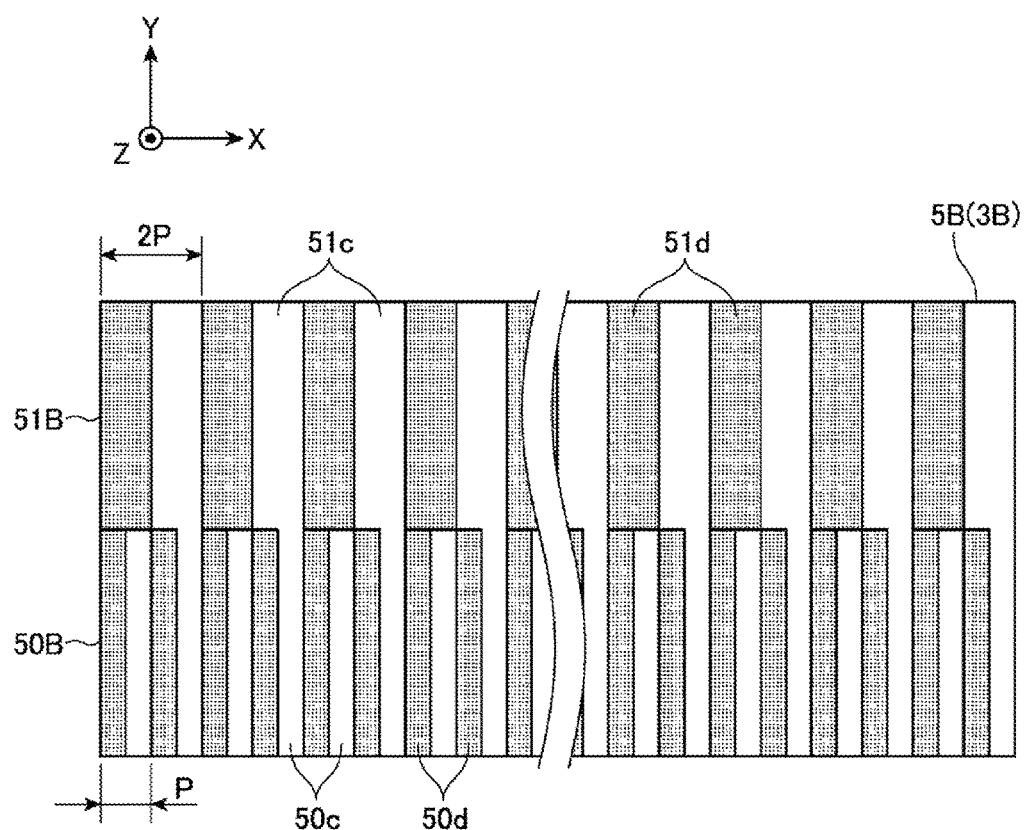
FIG. 10 illustrates an index of the photoelectric encoder.

FIG. 10 is a diagram illustrating the index of the photoelectric encoder according to the third embodiment.

As illustrated in FIG. 10, the index 5B includes a first index portion 50B and a second index portion 51B, and the first index portion 50B and the second index portion 51B are juxtaposed in the Y direction of the index 5B.

The first index portion 50B includes reflection portions 50c and non-reflection portions 50d alternately arranged in the X direction. The reflection portions 50c and the non-reflection portions 50d are arranged at a predetermined pitch P in the X direction, and the length of the non-reflection portion 50d in the X direction is set to P/2.

The second index portion 51B includes reflection portions 51c and non-reflection portions 51d alternately arranged in the X direction. The reflection portions 51c and the non-reflection portions 51d are arranged at a predetermined pitch 2P, twice the predetermined pitch P, in the X direction, and the length of the non-reflection portion 51d in the X direction is set to P.

Here, the first pattern portion 20 and the second pattern portion 21 of the scale 2 (see FIG. 2) and the first index portion 50B of the index 5B include the respective transmission portions 20a and 21a, reflection portion 50c, non-transmission portions 20b and 21b, and non-reflection portion 50d whose predetermined pitches P in the X direction are set to be the same. That is, the lengths of the transmission portions 20a and 21a, reflection portion 50c, non-transmission portions 20b and 21b, and non-reflection portion 50d in the X direction are set to the same P/2.

This configuration causes a light beam from the light emitting unit 4 to be reflected by the first index portion 50B having a reflective diffraction grating, and the light beam diffracted by the reflection is applied to the first pattern portion 20 and the second pattern portion 21 of the scale 2. The irradiated light beam passes through the first pattern portion 20 and the second pattern portion 21, the light beam diffracted by the transmission is applied to the detection unit 6 as interference fringes, and the detection unit 6 detects the INC signal 7 from the interference fringes (see FIG. 4A).

In addition, a light beam from the light emitting unit 4 is reflected by the second index portion 51B having a reflective diffraction grating, and the light beam diffracted by the reflection is applied to the first pattern portion 20 and the second pattern portion 21 of the scale 2. The irradiated light beam passes through the first pattern portion 20 and the second pattern portion 21, the light beam diffracted by the transmission is applied to the detection unit 6 as interference fringes, and the detection unit 6 detects the ABS signal 8 from the interference fringes (see FIG. 4B).

According to the present embodiment as described above, the same actions and effects as (2) to (6) in the above embodiment can be exhibited, and the following actions and effects can be exhibited.

(8) The photoelectric encoder 1B generates interference fringes by causing the index 5B to reflect the light beam from the light emitting unit 4 and transmitting the light beam reflected by the index 5B to the scale 2, and the INC signal 7 to be detected from the generated interference fringes is detected as one INC signal 7 in a non-dropout state, and therefore even when the INC pattern and the ABS pattern are integrated into a series of scale patterns to be arranged, the detection accuracy of the position information can be improved.

[Modification of Embodiments]

It should be noted that the present invention is not limited to each of the embodiments, and variations, improvements, and the like within the scope of achieving the object of the present invention are included in the present invention.

Figure 11:
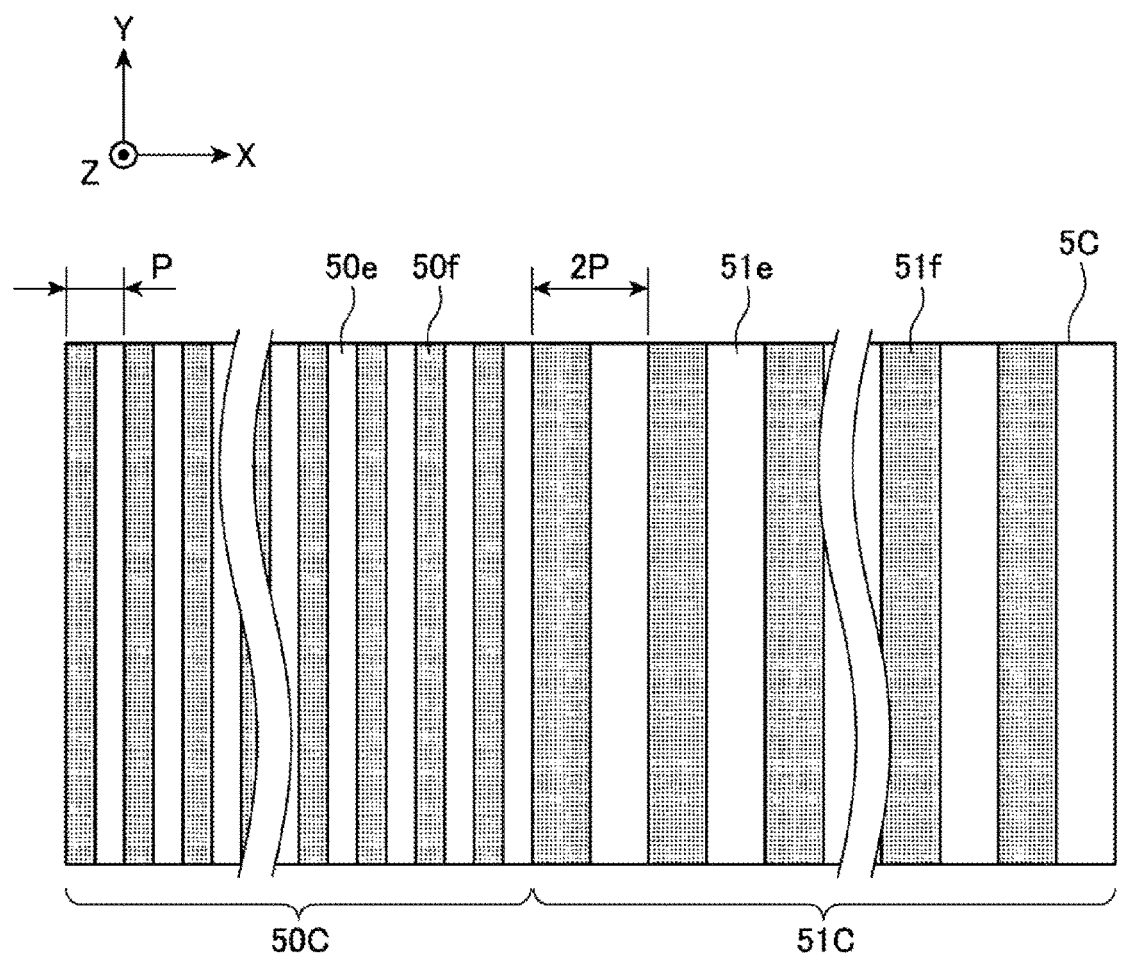
FIG. 11 illustrates a modified example of the index of the photoelectric encoder according to each embodiment of the present invention.

For example, although in each of the embodiments, the first index portion 50 or 50B and the second index portion 51 or 51B in the index 5 or 5B are juxtaposed in the Y direction, as illustrated in FIG. 11, in the index 5C having the first index portion 50C and the second index portion 51C consisting of diffraction portions 51e (transmission portions or reflection portions) and non-diffraction portions 51f (non-transmission portions or non-reflection portions), the first index portion 50C and the second index portion 51C may be arranged in the X direction. It should be noted that in FIG. 11, the first index portion 50C is arranged on the left side in the X direction, and the second index portion 51C is arranged on the right side thereof, but the second index portion 51C may be arranged on the left side in the X direction, and the first index portion 50C may be arranged on the right side thereof. Thus, even when the first index portion 50C and the second index portion 51C are juxtaposed in the longitudinal direction of the scale 2 or 2 A, the detection position of the detection unit 6 corresponding to each of the index portions 50C and 51C is specified, and therefore the INC signal 7 and the ABS signal 8 can be detected by appropriately calculating the detected interference fringes.

Figure 12:
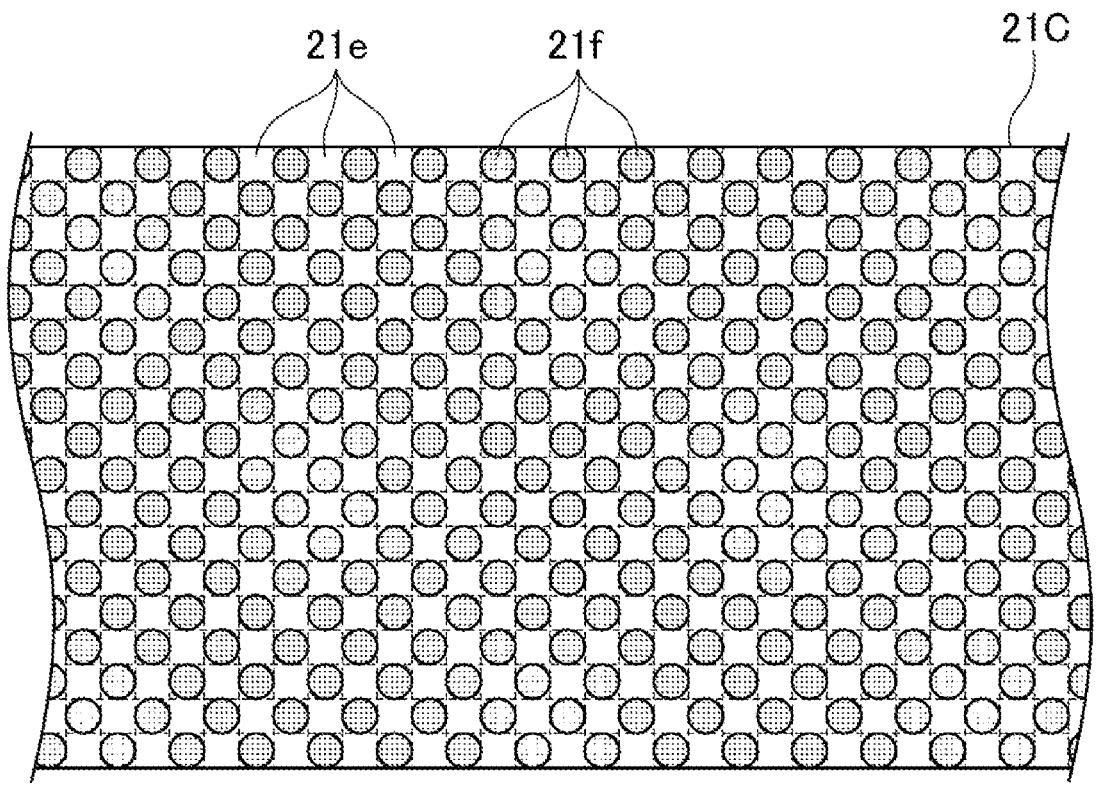
FIG. 12 illustrates a modified example of the scale pattern of the photoelectric encoder according to each embodiment of the present invention.

In addition, although in each of the embodiments, the non-transmission portion 21b of the second pattern portion 21 and the non-reflection portion 21d of the second pattern portion 21A in the scale 2 or 2A are rectangular, the shape is not limited to a rectangle and may be any shape. For example, as illustrated in FIG. 12, the second pattern portion 21C having either one of the transmissive diffraction grating or the reflective diffraction grating may form the non-diffraction portions 21f in a circular shape. In addition, the second pattern portion 21C may form the diffraction portions 21e in a circular shape. That is, the diffraction portions 21e and the non-diffraction portions 21f of the second pattern portion 21C may be mutually arranged in a checkerboard pattern in the X and Y directions, and the individual shapes of the diffraction portion 21e and the non-diffraction portion 21f are not particularly limited, and appropriate shapes such as an elliptical shape and any polygonal shape can be selected besides the rectangular shape and the circular shape.

Although in each of the embodiments, the first pattern portion 20 or 20 A and the second pattern portion 21 or 21 A of the scale 2 or 2 A are arranged in the arrangement pattern of the M sequence code, they are not limited thereto, and are only needed to be arranged in any arrangement pattern such as the pseudo random arrangement. That is, the ABS signal is only needed to be detected from the respective patterns of the interference fringes based on the arrangement of the first pattern portion 20 or 20 A and the second pattern portion 21 or 21 A, and the arrangement pattern can be arbitrarily set.

Although in the second embodiment, the detection head 3A includes the index 5 and the detection unit 6 juxtaposed in the X direction, the index 5 and the detection unit 6 may be juxtaposed in the Y direction.

INDUSTRIAL APPLICABILITY

As described above, the present invention can be used for a photoelectric encoder capable of reducing errors in position information between the INC pattern and the ABS pattern and capable of improving the detection accuracy by detecting the INC signal without any signal dropout.

What is claimed is:

1. A photoelectric encoder for acquiring position information from a relative movement amount between a scale having a scale pattern and a detection head, the photoelectric encoder comprising:
    a light emitting unit configured to emit a light beam;
    an index configured to diffract the light beam from the light emitting unit toward the scale; and
    a detection unit configured to detect an interference fringe generated through the index and the scale to output an electric signal,
    wherein the index includes:
        a first index portion consisting of diffraction portions and non-diffraction portions alternately arranged at a predetermined pitch along a longitudinal direction of the scale, and
        a second index portion consisting of diffraction portions and non-diffraction portions arranged alternately at twice the pitch of the first index portion,
    wherein the scale pattern includes:
        a first pattern portion consisting of diffraction portions and non-diffraction portions alternately arranged at a predetermined pitch along a longitudinal direction of the scale, and
        a second pattern portion consisting of diffraction portions and non-diffraction portions arranged in a checkered pattern at a predetermined pitch along a longitudinal direction of the scale,
    wherein the first pattern portion and the second pattern portion are alternately juxtaposed along a longitudinal direction of the scale, and
    wherein the detection unit detects:
        an incremental signal by an interference fringe generated by the first index portion, the first pattern portion, and the second pattern portion, and
        an absolute signal by an interference fringe generated by the second index portion, the first pattern portion, and the second pattern portion.

2. The photoelectric encoder according to claim 1, wherein the first pattern portion and the second pattern portion are juxtaposed in such a manner that mutual lengths of the first pattern portion and the second pattern portion along the longitudinal direction of the scale make an M-sequence code.

3. The photoelectric encoder according to claim 1, wherein the first index portion and the second index portion are juxtaposed in a transverse direction of the scale.

4. The photoelectric encoder according to claim 2, wherein the first index portion and the second index portion are juxtaposed in a transverse direction of the scale.

* * * * *